(12) United States Patent
Tang (10) Patent No.: US 10,443,222 B2
(45) Date of Patent: Oct. 15, 2019

(54) TOILET

(71) Applicant: Yi-Wen Tang, Taichung (TW)

(72) Inventor: Yi-Wen Tang, Taichung (TW)

( * ) Notice: Subject to any disclaimer, the term of this patent is extended or adjusted under 35 U.S.C. 154(b) by 151 days.

(21) Appl. No.: 15/866,463

(22) Filed: Jan. 10, 2018

(65) Prior Publication Data

US 2019/0211539 A1 Jul. 11, 2019

(51) Int. Cl.
*E03D 5/10* (2006.01)

(52) U.S. Cl.
CPC .................... *E03D 5/105* (2013.01)

(58) Field of Classification Search
CPC .................................. E03D 5/105
USPC ............................................ 4/406
See application file for complete search history.

(56) References Cited

U.S. PATENT DOCUMENTS

| 8,418,277 B2* | 4/2013 | Okubo ............... E03D 5/01 4/332 |
| 2008/0028507 A1* | 2/2008 | Ozenick ........... E03D 5/105 4/313 |
| 2014/0283291 A1* | 9/2014 | Austin ............. E03D 5/105 4/249 |
| 2017/0073954 A1* | 3/2017 | Lor ................. E03D 5/105 |
| 2019/0161948 A1* | 5/2019 | Tang ............... E03D 5/105 |

* cited by examiner

*Primary Examiner* — Tuan N Nguyen (57) ABSTRACT

A control assembly for a toilet and includes a control unit with a case for receiving a voice control panel therein which receives voice commands from users to activate a linear driving member to move a shaft connected thereto which moves linearly relative to the at least one linear driving member. A movable member is connected to the shaft so as to press a button connected to a toilet body to flush. The number of the buttons, the linear driving members, the shafts and the movable members can be increased to perform more actions.

11 Claims, 16 Drawing Sheets

TOILET

The present invention is a Continuation-In-Part application of applicant's former application with the application Ser. Nos. 15/821,853 and 15/822,194, filed on Nov. 24, 2017 and Nov. 26, 2017 respectively.

BACKGROUND OF THE INVENTION

1. Fields of the Invention

2. Descriptions of Related Art

The conventional toilet known to applicant is disclosed in U.S. Pat. No. 9,714,506 and comprises a body having a space defined therein. The body includes a first room and a second room, wherein the first room communicates with a first opening. The second room communicates with the first room and has a first flushing outlet which communicates with the second room. The second room is a curved pipe. The first flushing outlet is located close to a connection area between the first and second rooms. The first flushing outlet is used to flush the second room. The first room has a second flushing outlet which communicates with the first room. The second flushing outlet is located close to the first opening and is used to flush the first room. A control unit is connected to the body and has a communication pipe, a first electro-magnetic valve, a second electro-magnetic valve and a water-supply pipe. The communication pipe is located in the space and is a three-way pipe. The communication pipe has a first tube, a second tube and a third tube. The first tube, the second tube and the third tube communicate with each other. The first electro-magnetic valve is connected between the first tube of the communication pipe and a first water pipe. The second electro-magnetic valve is connected between the second tube of the communication pipe and a second water pipe. The water-supply pipe communicates with the third tube of the communication pipe. The control unit is connected with a tap water pipe by the water-supply pipe so that tap water flows to the communication pipe, the first electro-magnetic valve and the second electro-magnetic valve. A second pipe is located in the body and is connected with the second flushing outlet and the second water pipe of the second electro-magnetic valve. The second electro-magnetic valve controls the tap water to flow from the second electro-magnetic valve to the second pipe and the second flushing outlet to flush the first room. A first pipe unit is located in the body and connected with the first flushing outlet and the first water pipe of the first electro-magnetic valve. The first pipe unit has a first pipe and a first one-way valve. The first pipe is connected between the first flushing outlet and the first water pipe of the first electro-magnetic valve. The first one-way valve is connected to one end of the first pipe and seals the first flushing outlet so that the tap water flows from the first pipe to the first flushing outlet and cannot flows back to the first pipe. A controller is located in the space of the body and is electrically connected to the first and second electro-magnetic valves. The controller controls operation time of the first and second electro-magnetic valves.

It is noted that the toilet requires the uses to operate the fist button or the second button of the controller to activate the first and second electro-magnetic valves so as to flush the first room and second room. The first and second buttons are attached with a lot of germs, especially for those toilets for public use, and this becomes a serious health concern. Besides, for some disable users, the first and second buttons may not be conveniently accessed.

The present invention intends to provide a control assembly unit for a toilet that can be controlled by user's voice commands to eliminate the shortcomings mentioned above.

SUMMARY OF THE INVENTION

The present invention relates to a control assembly for a toilet and comprises a control unit with a case for receiving a voice control panel therein which receives voice commands from users to activate a linear driving member to move a shaft connected thereto which moves linearly relative to the at least one linear driving member. A movable member is connected to the shaft so as to press a button connected to a toilet body to flush. The number of the buttons, the linear driving members, the shafts and the movable members can be increased to perform more actions.

The primary object of the present invention is to provide a control unit for a toilet and the control unit allows the users to flush by voice commands.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 4, the control unit of the present invention comprises a control unit 10 having an elongate case 11 in which a room 111 is defined therein, and a recess 112 is defined in one side of the first end of the elongate case 11. The recess 112 communicates with the room 111. A voice control panel 12 is located in the room 111 and powered by multiple batteries 121 located in the recess 112. The control unit 10 allows the users to flush by voice commands. A cover 122 closes the recess 112 to restrict the batteries 121 from dropping out from the recess 112. A seal ring is located between the cover 122 and a periphery of the recess 112 to provide water-proof features. Multiple fastening members 123 extend through two ends of the cover 122 and are connected to the elongate case 11. Two linear driving members 13 are fixed in the room 111 and controlled by the voice control panel 12 which is electrically connected to one end of each of the linear driving members 13. The linear driving members 13 each are a small motor.

Each of the linear driving members 13 has a shaft 131 which is driven by the linear driving member 13 corresponding thereto. The shafts 131 are exposed beyond the linear driving members 13 and each have outer threads 132. Two movable members 14 each have inner threads 141 which are connected to the outer threads 132 of the shaft 131 corresponding thereto so that each of the movable members 14 is moved linearly along the shaft 131 corresponding thereto. Each of the movable members 14 has two ridges 142 extending radially from outside thereof. The two ridges 142 are located diametrically opposite to each other.

The control unit 10 has multiple restriction members 15. Each of the linear driving members 13 has two restriction members 15 connected thereto. Each restriction member 15 has an elongate slot 151 which is engaged with the ridge 142 corresponding thereto, so that the movable member 14 does not rotate. The movable members 14 each move linearly along the slot 151 of the restriction member 15 corresponding thereto. Multiple bolts 16 extend through the restriction members 15 and the linear driving members 13, and are connected to nuts 161 to connect the restriction members 15 to the linear driving members 13.

Figure 1:
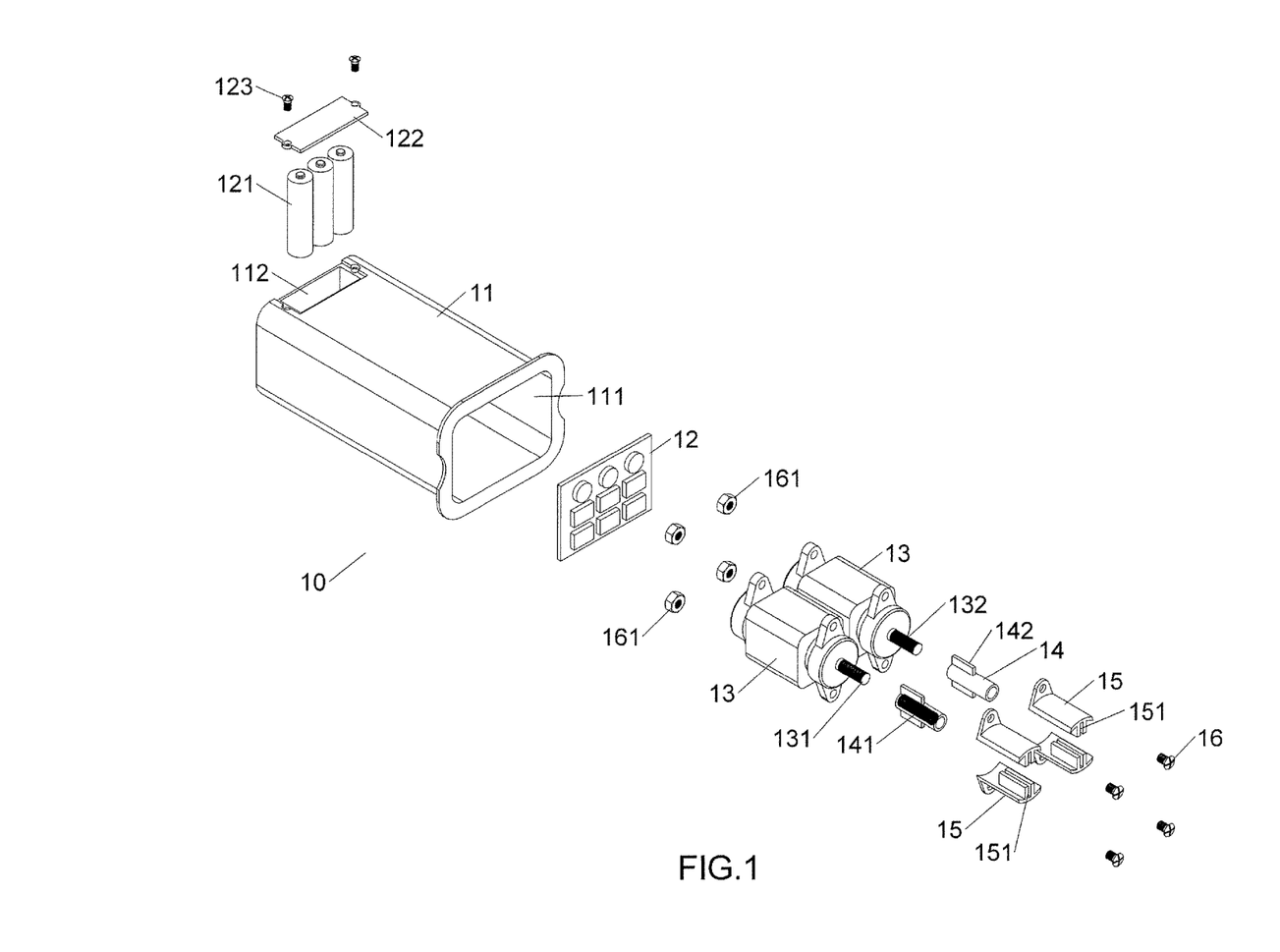
FIG. 1 is an exploded view of the control unit of the present invention.
Figure 2:
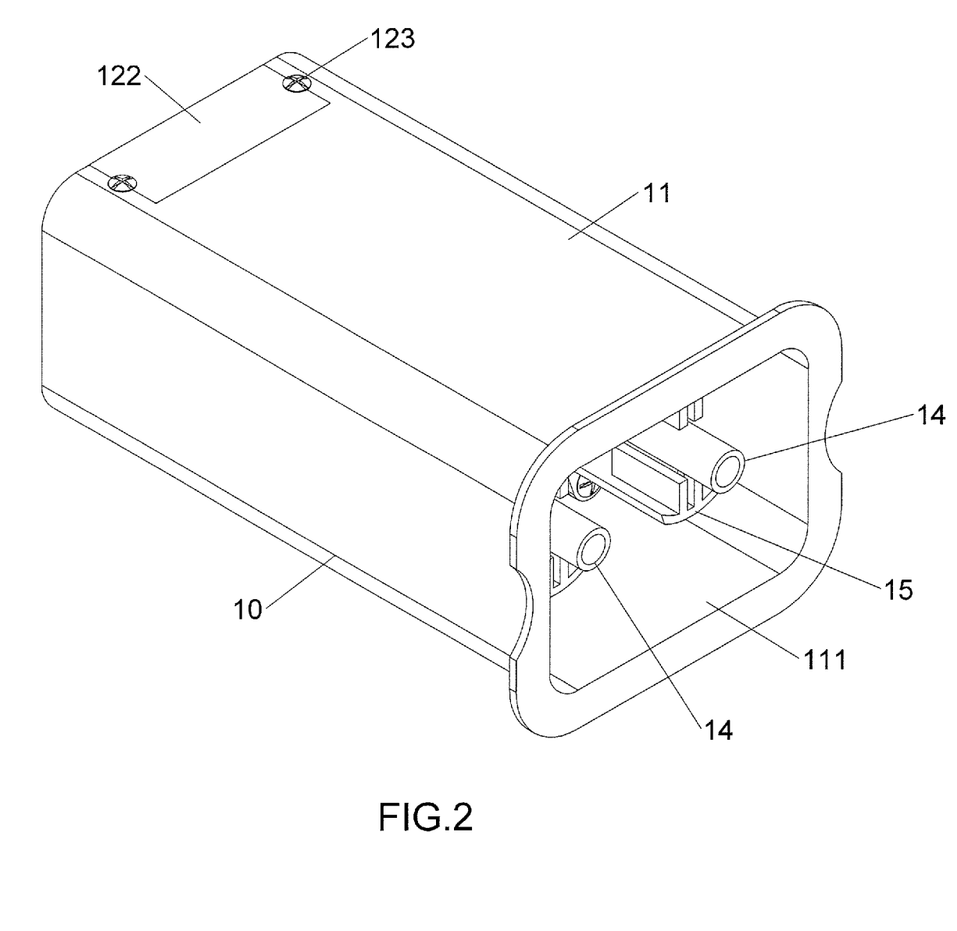
FIG. 2 is a perspective view to show the control unit of the present invention.
Figure 3:
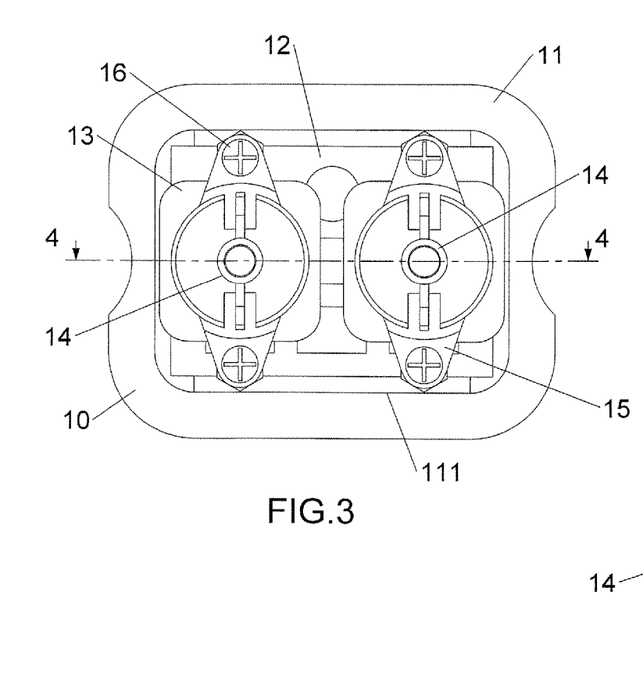
FIG. 3 is a side view to show the control unit of the present invention.
Figure 4:
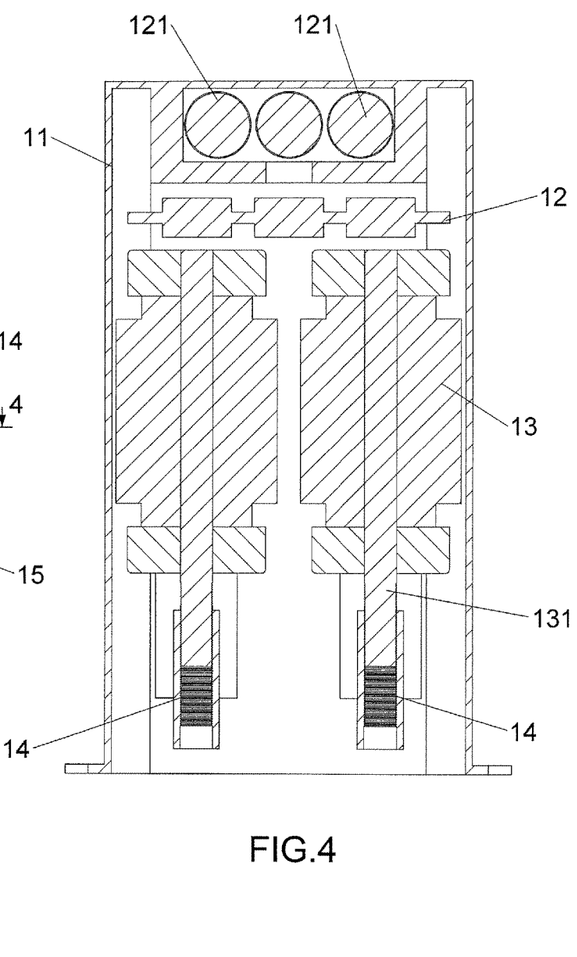
FIG. 4 is a cross sectional view, taken along line 4-4 in FIG. 3.
Figure 5:
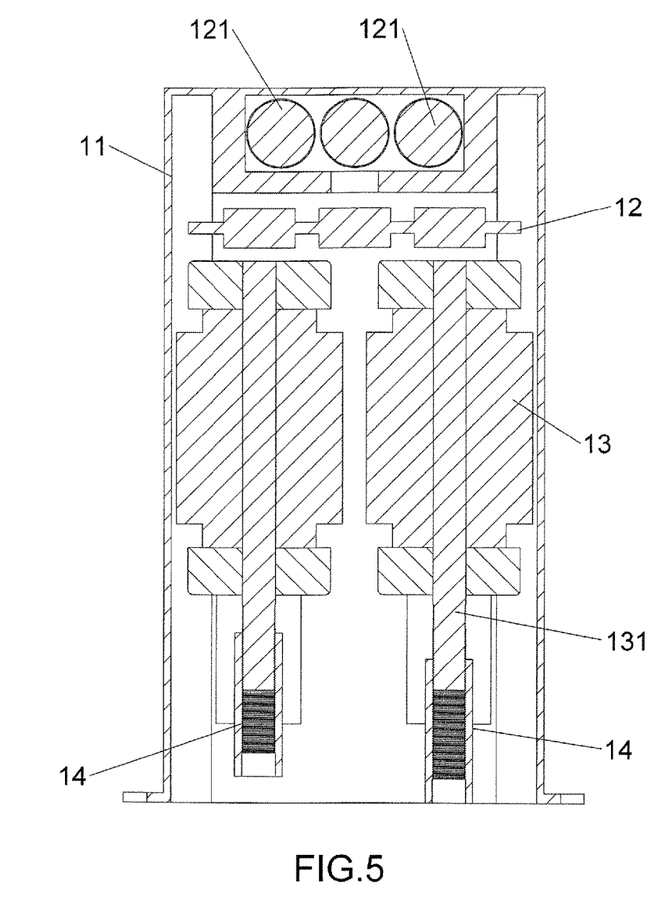
FIG. 5 is a cross sectional view, taken along line 4-4 in FIG. 3 to show another operational status.
Figure 6:
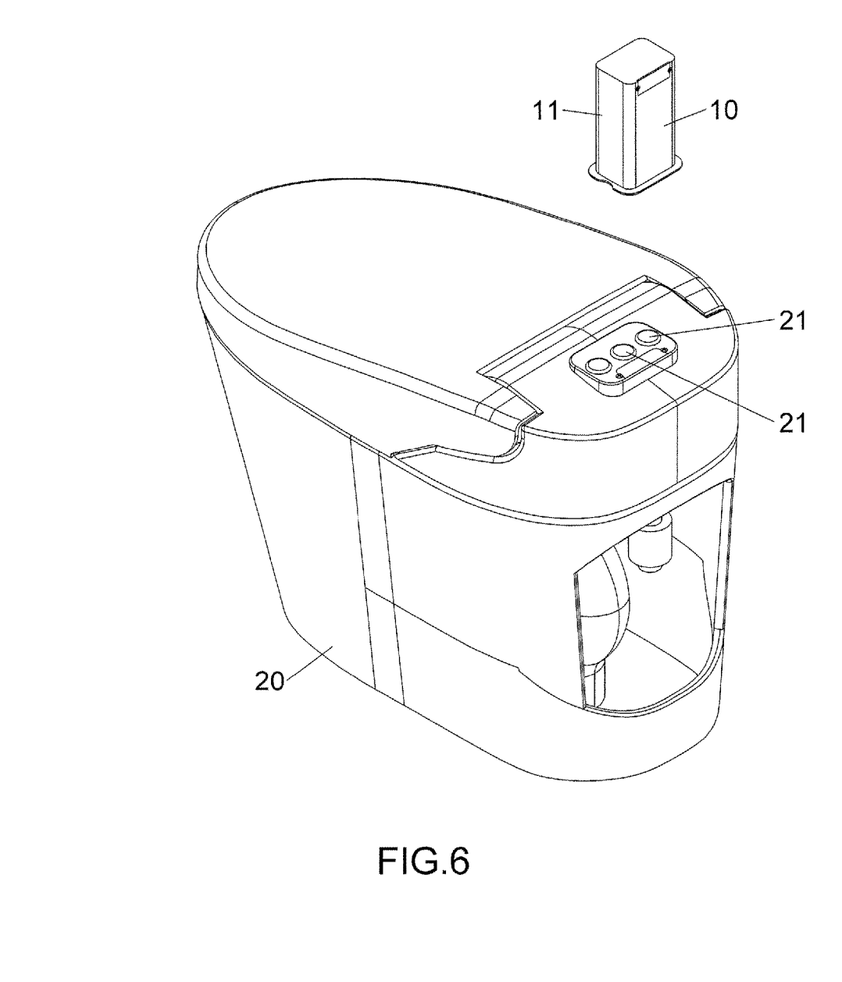
FIG. 6 shows that the control unit of the present invention is to be installed to a toilet.
Figure 7:
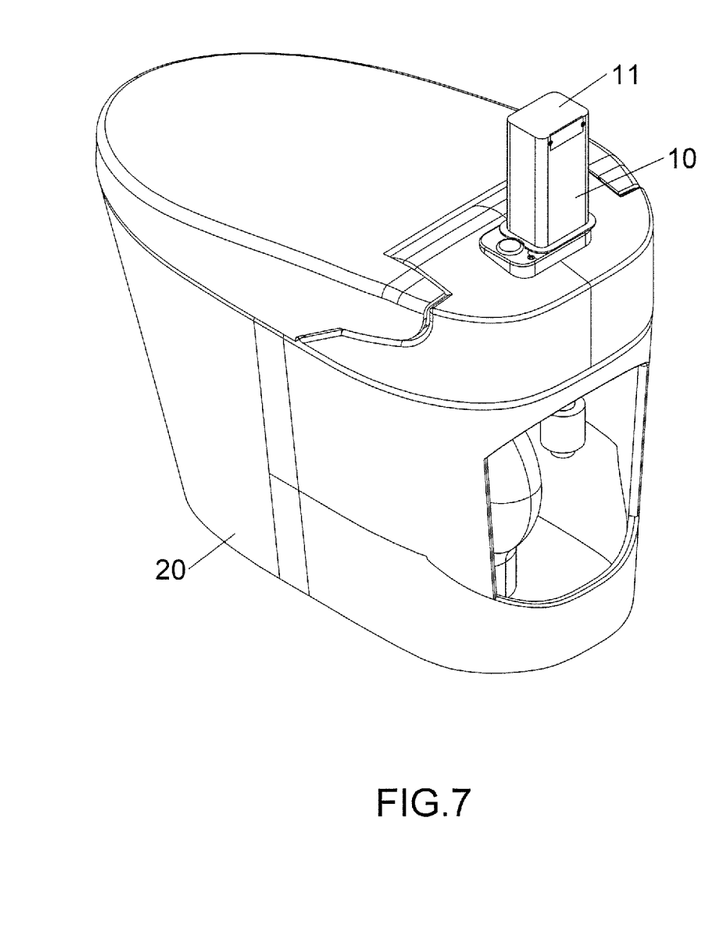
FIG. 7 is a perspective view to show the control unit of the present invention is installed to a toilet.
Figure 8:
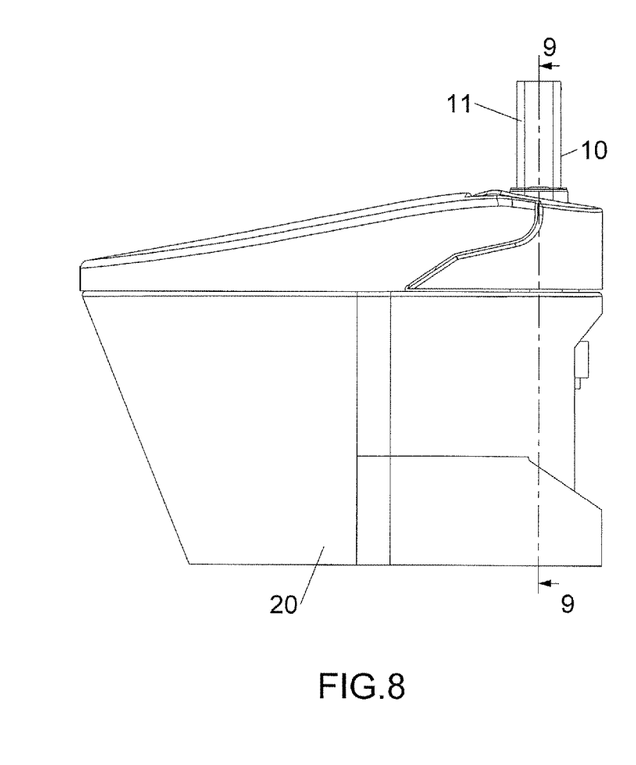
FIG. 8 is a side view of the toilet and the control unit of the present invention in FIG. 7.
Figure 9:
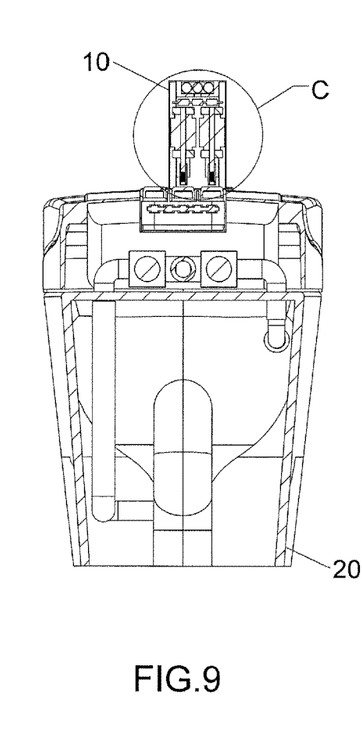
FIG. 9 is a cross sectional view, taken along line 9-9 in FIG. 8.
Figure 10:
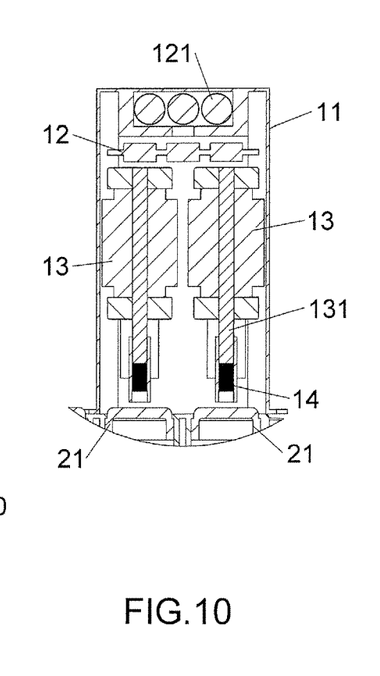
FIG. 10 is an enlarged view of the circled C in FIG. 9.

As shown in FIG. 5, when the users deliver voice commands to the voice control panel 12, the voice control panel 12 activates one of the linear driving members 13 so that the shaft 131 rotates and the movable member 14 moves along the shaft 131.

Figure 11:
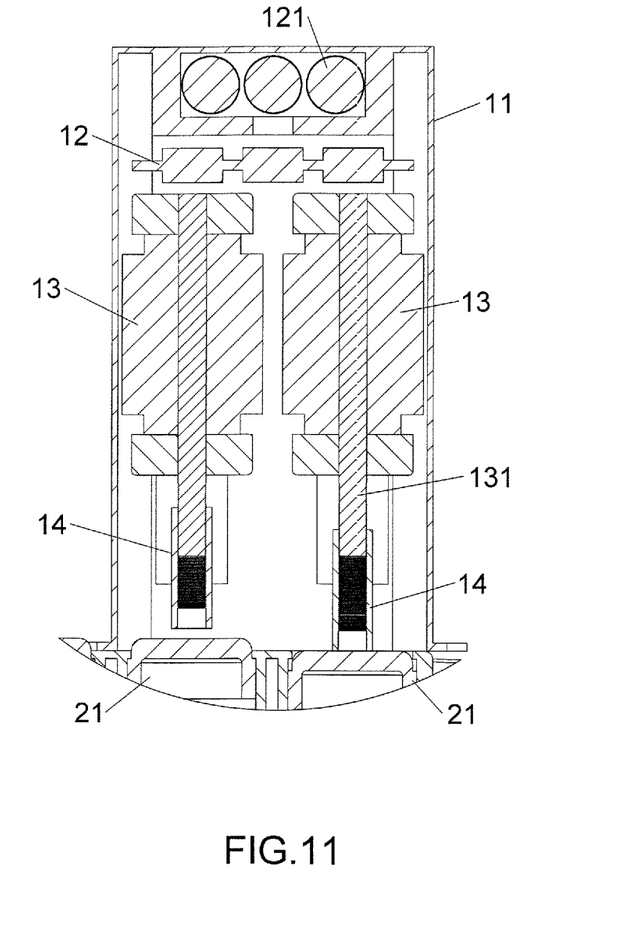
FIG. 11 is an enlarged view of the circled C in FIG. 9 to show another operational status.

As shown in FIGS. 6 to 10, there are two buttons 21 connected to the toilet body 20, and the control unit 10 connected to the buttons 21. The two buttons 21 are respectively pressed by the movable members 14 to proceed major flush action and minor flush action. As shown in FIG. 11, one of the movable members 14 is lowered to press the button 21 to flush.

Figure 12:
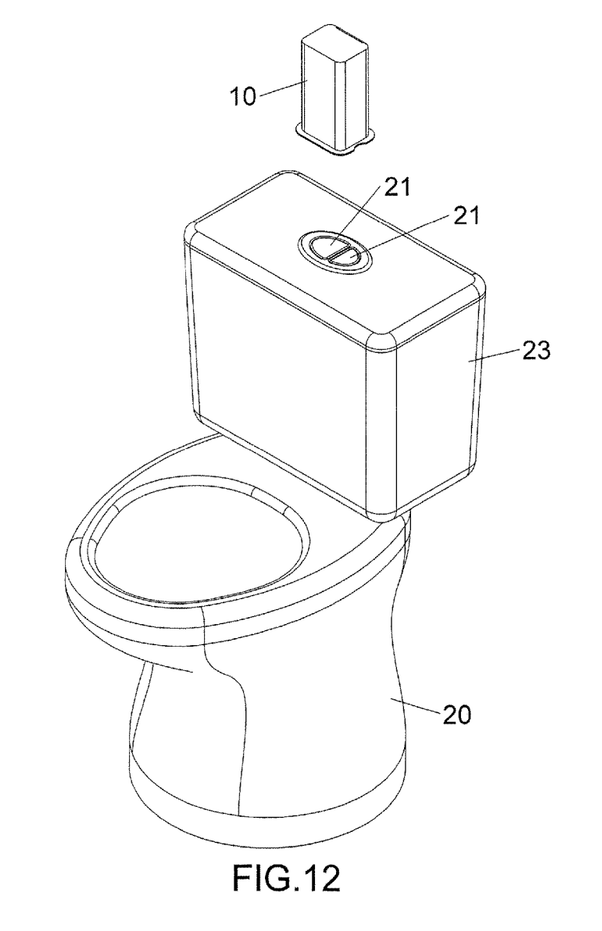
FIG. 12 shows a second embodiment of the present invention.

As shown in FIG. 12, the toilet body 20 has a tank 23 connected thereto, and the buttons 21 are connected to the tank 23.

Figure 13:
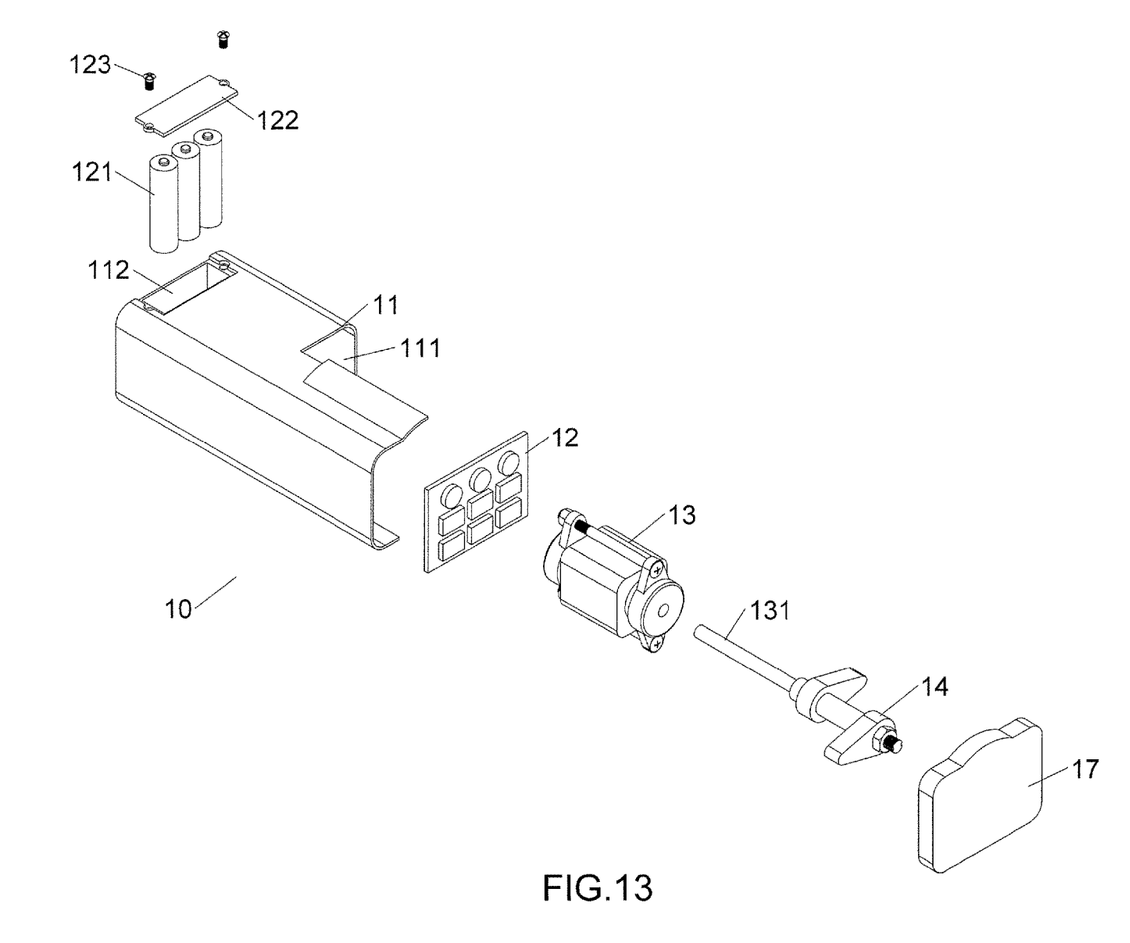
FIG. 13 is an exploded view to show the third embodiment of the control unit of the present invention.
Figure 14:
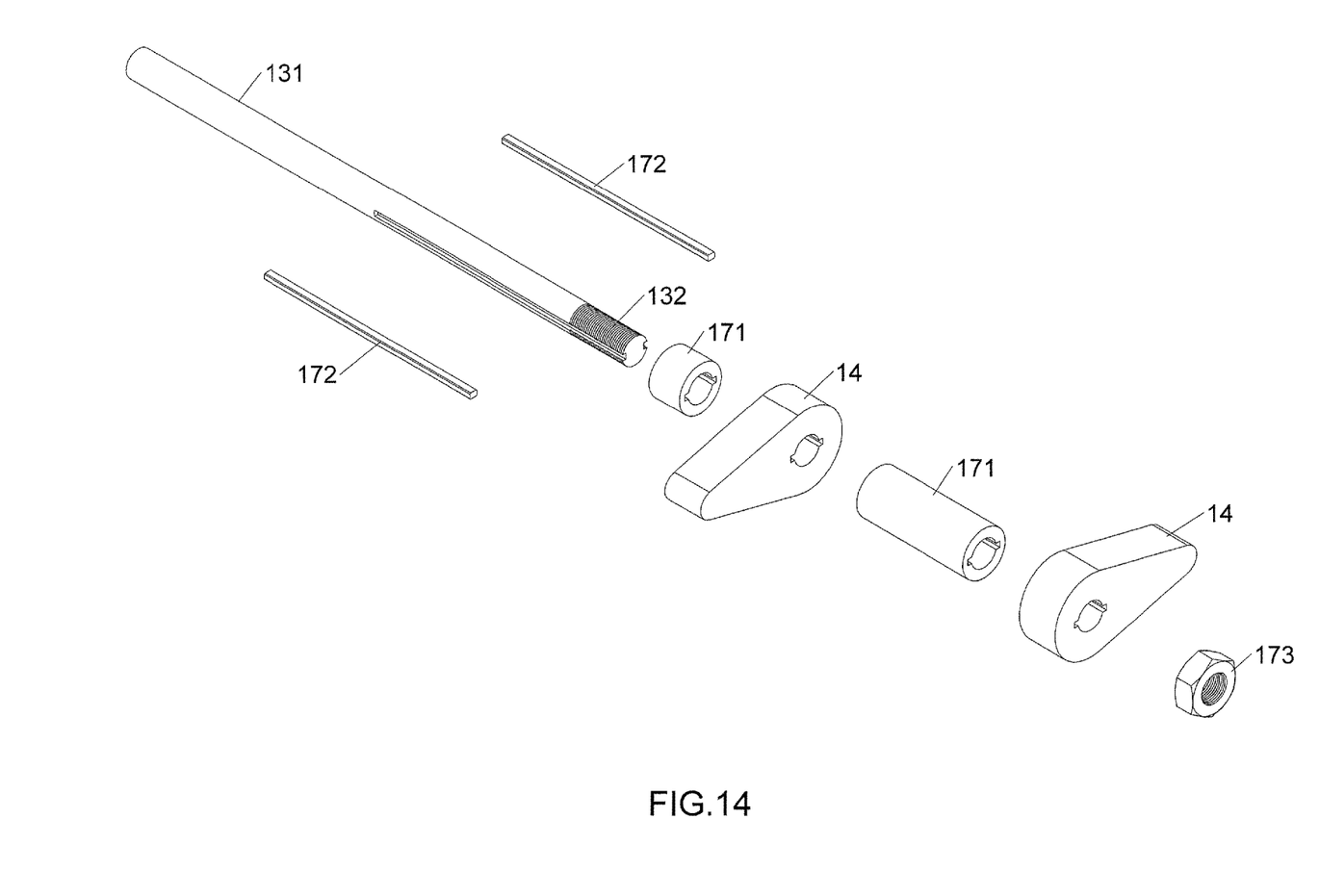
FIG. 14 is another exploded view to show the third embodiment of the control unit of the present invention.

FIGS. 13 and 14 show that the case 11 of the control unit 10 includes a partially opened area. The control unit 10 includes only one linear driving member 13, one shaft 131, two buttons 21 and two movable members 14. The two movable members 14 are connected to the shaft 131 and spaced apart from each other. The two movable members 14 are located corresponding to the partially opened area of the control unit 10 and extend in two opposite directions. In this embodiment, the two movable members 14 are two cams which are rotated with the shaft 131. The partially opened area of the control unit 10 is located corresponding to the two buttons 21 of the toilet body 20. There is no restriction member 15 in this embodiment. The control unit 10 includes a cap 17 which closes the second end of the case 11. The control unit 10 includes two separation members 171 which are mounted to the shaft 131 and respectively located between the two movable members 14 and one end of one of the two movable members 14. The control unit 10 includes two strips 172 which are co-rotatably and radially connected to the shaft 131. The movable members 14 and the separation members 171 are mounted to the two strips 172 so that the two movable members 14 are co-rotatable with the shaft 131. The outer threads 132 of the shaft 131 are connected to a nut 173 which contacts one end of one of the movable members 14 so that the two movable members 14 and the two separation members 171 do not drop from the shaft 131.

Figure 15:
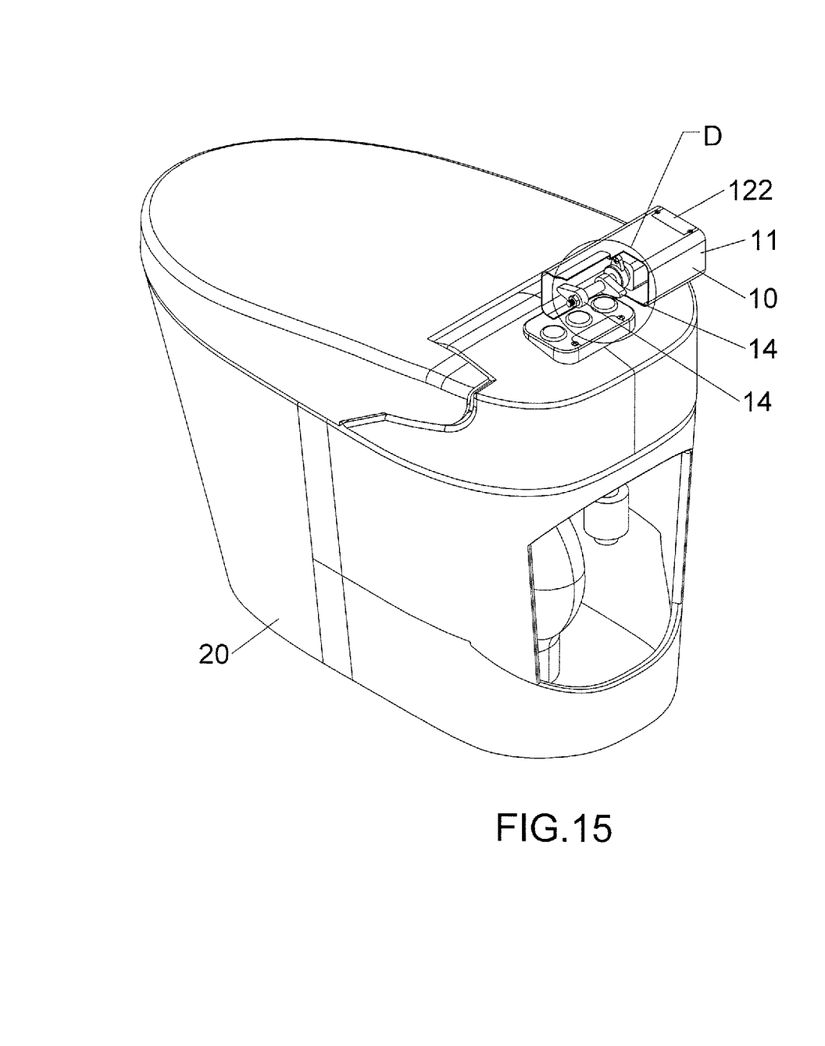
FIG. 15 is a perspective view to show the third embodiment of the control unit of the present invention installed to a toilet.
Figure 16:
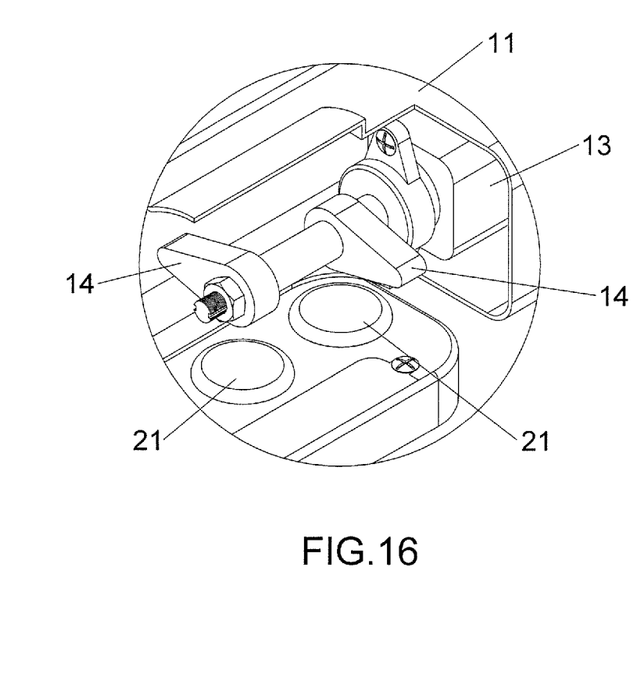
FIG. 16 is an enlarged view of the circled D in FIG. 15.
Figure 17:
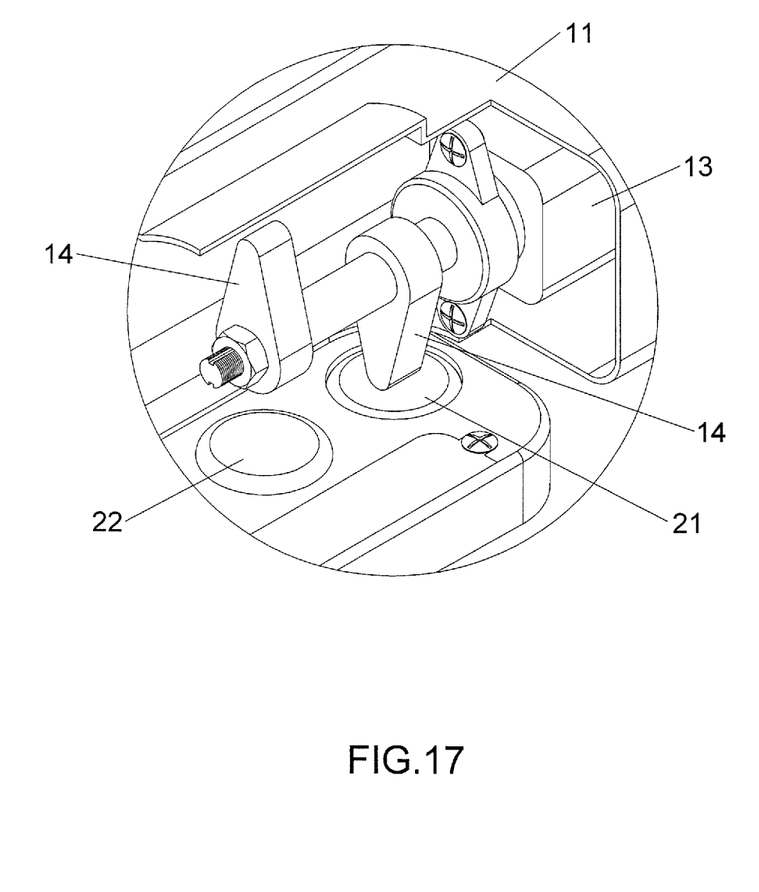
FIG. 17 is an enlarged view of the circled D in FIG. 15 to show another operational status.
Figure 18:
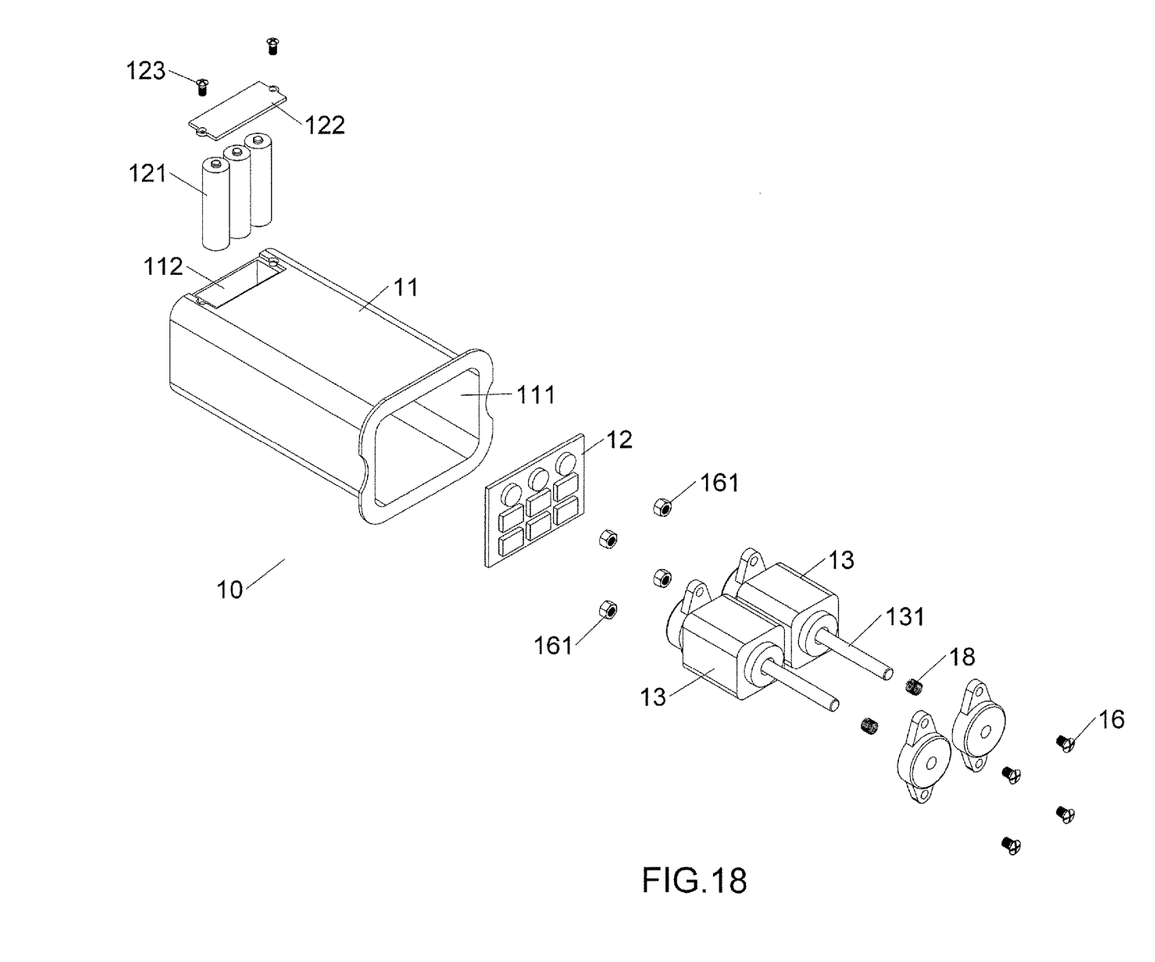
FIG. 18 is an exploded view to show the fourth embodiment of the control unit of the present invention.
Figure 19:
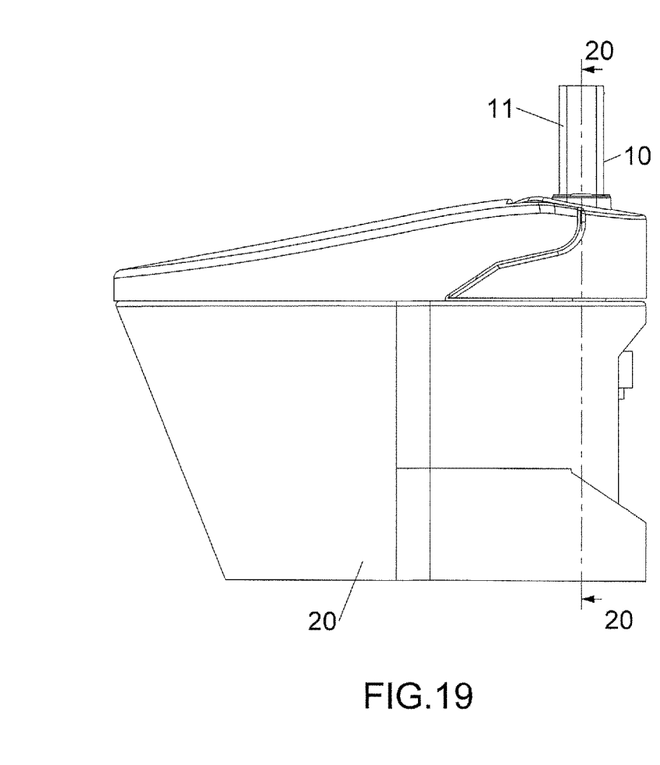
FIG. 19 is a side view to show the fourth embodiment of the control unit of the present invention installed to a toilet.
Figure 20:
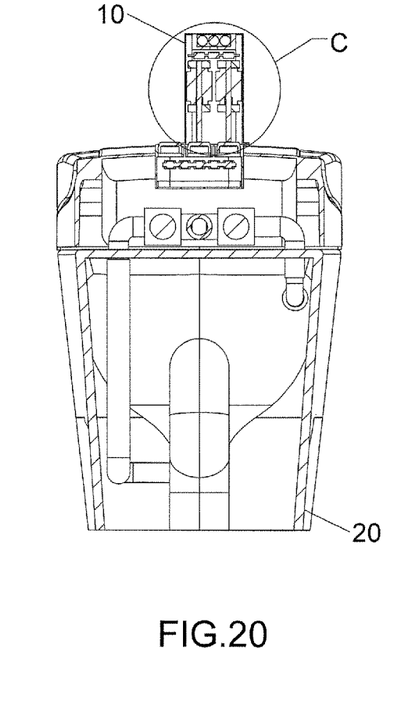
FIG. 20 is a cross sectional view, taken along line 20-20 in FIG. 19.
Figure 21:
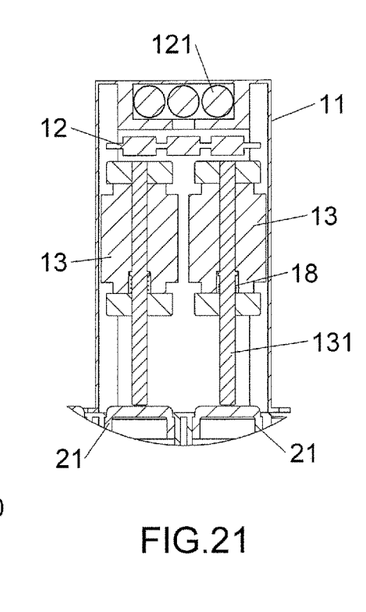
FIG. 21 is an enlarged view of the circled C in FIG. 20.

As shown in FIGS. 15 to 17, the partially opened area of the control unit 10 is located corresponding to the two buttons 21, 22 of the toilet body 20. When the users send voice commands which are received by the voice control panel 12, the shaft 131 is activated and rotated, one of the two movable members 14 presses the button 21, and the other one of the two movable members 14 is located away from the other button 22.

As shown in FIGS. 18 to 21, the linear driving members 13 each are an electro-magnetic valve, and the shaft 131 extends through the linear driving member 13 corresponding thereto. The movable members 14 are integral with the shaft 131. There is no restriction member 15 in this embodiment. The bolts 16 extend through the linear driving members 13 and are connected to the nuts 161 to connect the linear driving members 13 to the shafts 131. Each of the linear driving members 13 has a resilient member 18 which is mounted to the shaft 131 and biased between the linear driving member 13 and the shaft 131. The two shafts 131 are located corresponding to the two buttons 21 the linear driving members 13 each are an electro-magnetic valves.

Figure 22:
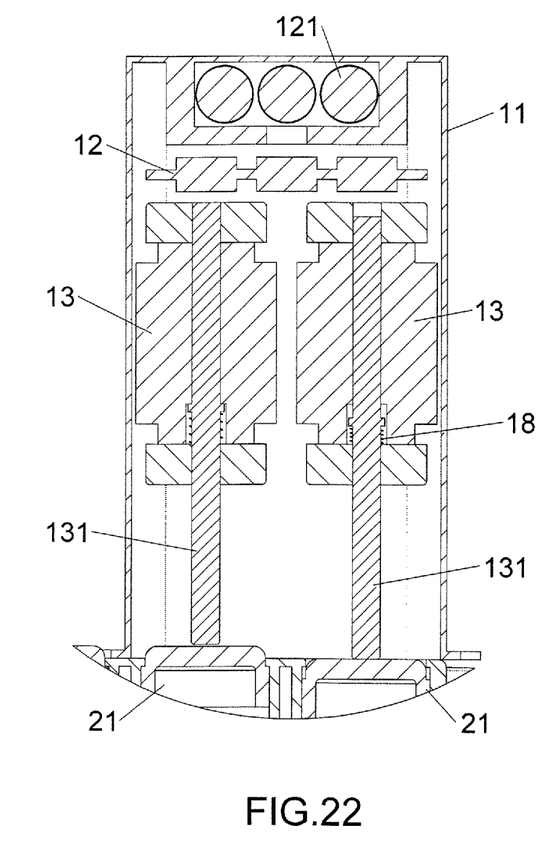
FIG. 22 is an enlarged view of the circled C in FIG. 20 to show another operational status.

As shown in FIG. 22, when the voice control panel 12 receives voice commands to activate one of the linear driving members 13 are an electro-magnetic valve. The shaft 131 moves to compress the resilient member 18 and presses the button 21 corresponding to the shaft 131 so as to flush.

The advantages of the present invention are that the control unit 10 is cooperated with the buttons, and the users use voice commands to activate the linear driving members 13 to rotate the shafts 131 and to move the movable members 14 so as to flush.

When the voice control panel 12 receives the voice commands, the linear driving members 13 are activated, the shafts 131 are threadedly rotated in the correspondent linear driving member 13, and the movable member 14 is moved along the shaft 131 due to the engagement between the outer threads 132 and the inner threads 141, such that the movable member 14 moves to press the button 21 to flush.

While we have shown and described the embodiment in accordance with the present invention, it should be clear to those skilled in the art that further embodiments may be made without departing from the scope of the present invention.

What is claimed is:

1. A toilet, comprising:
a control unit having a case having a room defined therein and a recess defined in one side of a first end of the case, the recess communicating with the room;
at least one voice control panel located in the room;
multiple batteries located in the recess and providing electric power to the voice control panel;
a cover closing the recess to restrict the batteries from dropping out from the recess, a seal ring located between the cover and a periphery of the recess;
multiple fastening members extending through two ends of the cover and connected to the case;
at least one linear driving member fixed in the room and controlled by the at least one voice control panel which is electrically connected to one end of the at least one linear driving member;
each of the at least one linear driving member having a shaft which is driven by the at least one linear driving member corresponding thereto;
at least one movable member connected to the shaft corresponding thereto which moves the at least one movable member, and
at least one button connected to a toilet body, the control unit connected to the at least one button, the at least one movable member located corresponding to the at least one button is pressed when the at least one button corresponding thereto moves.

2. The toilet as claimed in claim 1, wherein the at least one voice control panel receives voice commands from users to flush.

3. The toilet as claimed in claim 1, wherein the at least one linear driving member comprising two linear driving members, two shafts and two movable members.

4. The toilet as claimed in claim 1, wherein the at least one linear driving member is a motor, the shaft is exposed beyond the at least one linear driving member and driven by the at least one linear driving member, the shaft has outer threads, the at least one movable member is connected to the shaft corresponding thereto and includes inner threads with which the outer threads of the shaft are engaged, the outer threads of the shaft are rotated to drive the at least one movable member to move linearly along the shaft, each of the at least one movable member has two ridges extending radially from outside thereof, the two ridges are located diametrically opposite to each other, the control unit has multiple restriction members, each of the at least one linear driving member has two restriction members connected thereto, each restriction member has a slot which is engaged with the ridge corresponding thereto so that the at least one movable member does not rotate, the at least one movable member moves linearly along the slot of the restriction member corresponding thereto, multiple bolts extend through the restriction members and the at least one linear driving member and are connected to nuts to connect the restriction members to the at least one linear driving member.

5. The toilet as claimed in claim 1, wherein the at least one linear driving member comprising two linear driving members, two shafts, two movable members and two buttons, the two buttons respectively control major flush and minor flush, the two movable members are located corresponding to the two buttons, the two movable members are respectively activated to press the two buttons.

6. The toilet as claimed in claim 1, wherein the toilet body has a tank connected thereto, the at least one button is connected to the tank.

7. The toilet as claimed in claim 1, wherein the case of the control unit includes a partially opened area, the control unit includes only one linear driving member, one shaft, two buttons and two movable members, the two movable members are connected to the shaft and spaced apart from each other, the two movable members are located corresponding to the partially opened area of the control unit and extend in two opposite directions, the two movable members are two cams which are rotated with the shaft, the partially opened area of the control unit is located corresponding to the two buttons of the toilet body, when the shaft is rotated, one of the two movable members presses one of the buttons, and the other one of the two movable members is located away from the other one of the buttons.

8. The toilet as claimed in claim 7, wherein the control unit includes a cap which closes a second end of the case.

9. The toilet as claimed in claim 7, wherein the control unit includes two separation members which are mounted to the shaft and respectively located between the two movable members and one end of one of the two movable members, the control unit includes two strips which are co-rotatably and radially connected to the shaft, the movable members and the strips are mounted to the two strips so that the two movable members are co-rotatable with the shaft, the outer threads of the shaft are connected to a nut which contacts one end of one of the movable members so that the two movable members and the two separation members do not drop from the shaft.

10. The toilet as claimed in claim 5, wherein each of the two linear driving members is an electro-magnetic valve, the two shafts respectively extends through the two linear driving members, the movable members are respectively integral with the two shafts, each of the linear driving members has a resilient member which is mounted to the shaft and biased between the linear driving member and the shaft, the two shafts are located corresponding to the two buttons, when the voice control panel receives voice commands to activate one of the linear driving members, the shaft moves to compress the resilient member and presses the button corresponding to the shaft so as to flush.

11. The toilet as claimed in claim 1, wherein the control unit includes the same quantity of the linear driving member, the shaft and the movable member so as to respectively operate the same quantity of buttons on the toilet body.

* * * * *